United States Patent [19]

Granot

[11] Patent Number: 4,552,655

[45] Date of Patent: Nov. 12, 1985

[54] SELF-CLEANING FILTER APPARATUS

[76] Inventor: Moshe Granot, Moshav Adanim, Israel

[21] Appl. No.: 309,094

[22] Filed: Oct. 6, 1981

[51] Int. Cl.⁴ .............................................. B01D 19/02
[52] U.S. Cl. .................................... 210/108; 210/488
[58] Field of Search ........................ 210/106, 108, 488

[56] References Cited

U.S. PATENT DOCUMENTS

| | | | |
|---|---|---|---|
| 2,338,419 | 1/1944 | Forrest et al. ...................... | 210/412 |
| 3,853,762 | 12/1974 | Moatti ................................ | 210/108 |
| 3,994,810 | 11/1976 | Schaeffer ......................... | 210/108 X |
| 4,042,504 | 8/1977 | Drori ................................ | 210/108 X |
| 4,123,356 | 10/1978 | Sugimoto et al. .............. | 210/108 X |
| 4,156,651 | 5/1979 | Mehoudar ....................... | 210/488 X |

Primary Examiner—John Adee
Attorney, Agent, or Firm—Benjamin J. Barish

[57] ABSTRACT

Filter apparatus adapted to be operated according to either a filter mode or a self-cleaning mode comprises a housing having a filter body including a plurality of filter elements which are adapted to be pressed together during the filtering mode of operation, and spread apart during the self-cleaning mode of operation; a drive for moving the filter elements apart; and differential pressure control means sensing the difference in pressure between the upstream and downstream sides of the filter body, and effective, in response to sensing a differential pressure exceeding a predetermined value, to initiate a self-cleaning mode of operation by closing a first valve between the downstream side of the filter body and the clean fluid outlet, opening a second valve between the upstream side of the filter body and the dirty fluid outlet, and actuating the drive to permit the filter elements of the filter body to move apart.

10 Claims, 3 Drawing Figures

SELF-CLEANING FILTER APPARATUS

BACKGROUND OF THE INVENTION

The present invention relates to filter apparatus, and particularly to a self-cleaning filter which automatically cleans itself after it has accumulated a predetermined quantity of particles filtered from the fluid. The invention is particularly useful for filtering water irrigation systems and is therefore described below with respect to such an application, but it will be appreciated that the invention could advantageously be used in other applications as well.

Irrigation systems commonly include filters for removing foreign particles from the water in order to prevent clogging of the water irrigation devices, such as water sprinklers or drip emitters, connected to the water supply line. It is advantageous in such applications to have the filter clean itself periodically, as required, without either turning off the water, or detaching the filter from the water supply line. One known way for self-cleaning a filter in such applications is by reverse flushing, the filter including a cleaning nozzle which sweeps along and cleans the upstream side of the filter by producing a reverse water flow through the filter. In such known arrangements, the filter is usually provided with means for effecting relative movement between the cleaning nozzle and the filter body during the reverse flushing of the filter, in order to enable the cleaning nozzle to scan the complete surface of the filter body. Such arrangements, however, are quite complicated and expensive to produce and to maintain.

Another known arrangement for self-flushing a filter is to provide a battery of such filters with various valve control arrangements so that certain filters of the battery are used during the normal filtering operation, but upon the accumulation of an undue amount of foreign material within the filter, the valve controls redirect the water to flow through other filters of the battery while the dirtied filters are flushed by reverse flow. Such arrangements are also quite complicated and expensive.

An object of the present invention is to provide a novel form of self-cleaning filter apparatus having advantages in the above respects.

BRIEF SUMMARY OF THE INVENTION

According to a broad aspect of the present invention, there is provided filter apparatus adapted to be connected to a supply line for a fluid, such as irrigating water, to be filtered and to be operated according to either a filter mode or a self-cleaning mode. This filter apparatus comprises a housing having a filter body therein, which housing includes an inlet on the upstream side of the filter body, a clean fluid outlet on the downstream side of the filter body, and a dirty fluid outlet on the upstream side of the filter body. The filter body includes a plurality of filter elements which are adapted to be pressed together during the filtering mode of operation, and spread apart during the self-cleaning mode of operation. The filter apparatus further includes a drive for moving the filter elements apart; a first valve between the downstream side of the filter body and the clean fluid outlet; a second valve between the upstream side of the filter body and the dirty fluid outlet; and differential pressure control means sensing the difference in pressure between the upstream and downstream sides of the filter body, and effective, in response to sensing a differential pressure exceeding a predetermined value, to initiate a self-cleaning mode of operation by closing the first valve, opening the second valve, and actuating the drive to permit the filter elements of the filter body to move apart, thereby effecting a thorough rinsing of the filter elements by the fluid.

In the preferred embodiment of the invention described below, the filter elements are in the form of annular filter discs whose outer surfaces constitute the upstream side of the filter body and whose inner surfaces constitute the downstream side of the filter body.

Also, in the described preferred embodiment, the drive means comprises a motor which is actuated when the differential pressure control means senses the predetermined pressure difference to initiate a self-cleaning mode of operation; a control rod displaced by the motor; and a pressure member normally biased to press together the filter elements, but moved by the control rod when displaced by the motor to cause the filter elements to spread apart during the self-cleaning mode of operation.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
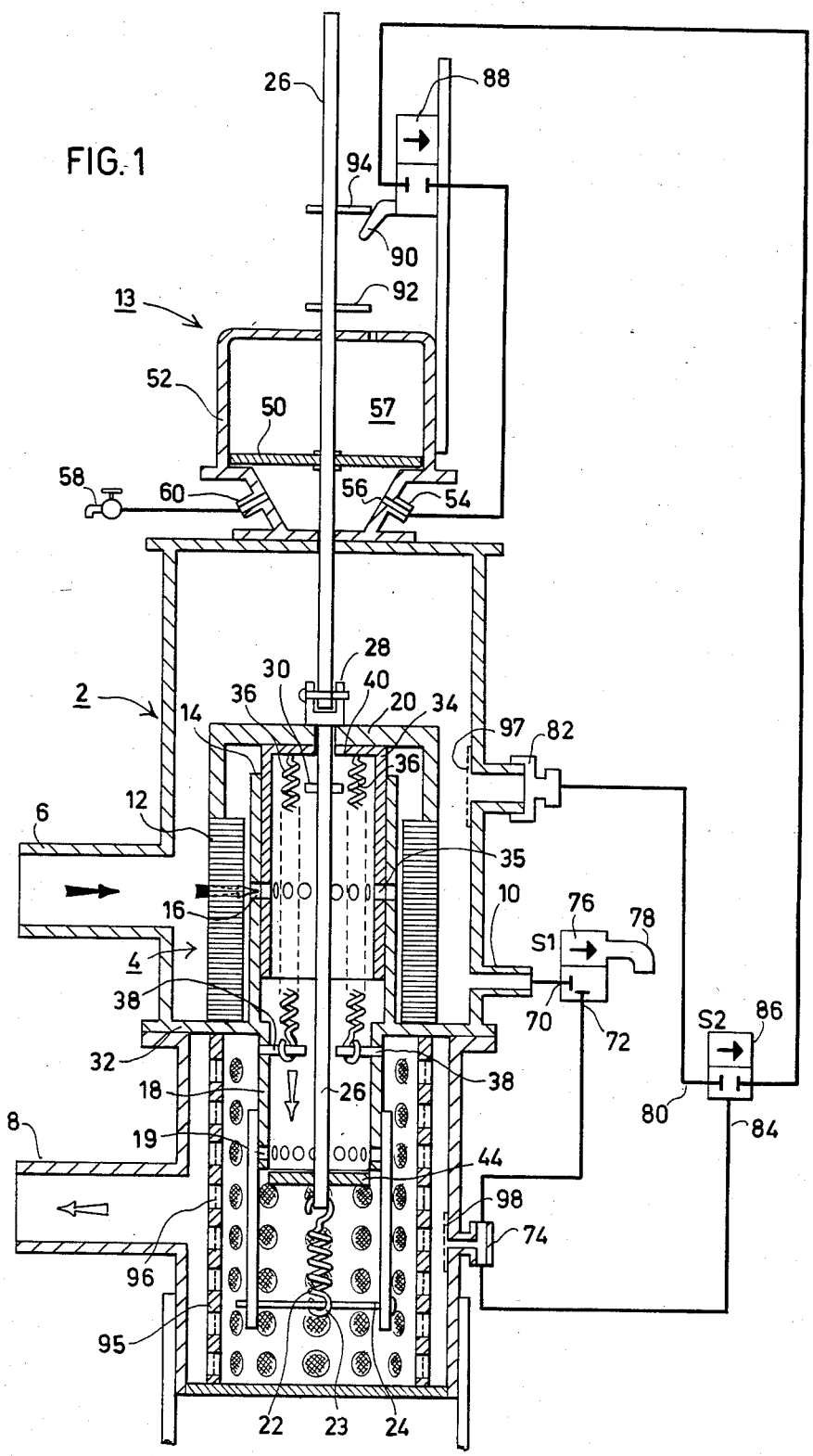
FIG. 1 is a longitudinal sectional view illustrating on form of filter apparatus constructed in accordance with the present invention, the parts of the apparatus being illustrated in their positions during the normal filtering mode of operation.

The filter apparatus illustrated in the drawings comprises a housing generally designated 2, having a filter body 4 disposed therein, housing 2 including an inlet 6 on the upstream side of the filter body, a clean water outlet 8 on the downstream side of the filter body, and a dirty water outlet 10 also on the upstream side of the filter body.

The filter body 4 within the housing 2 is of the type which includes a plurality of filter elements, particularly annular filter discs 12, having finely-ribbed side faces, as used for example in the ARKAL Filter 4900. As in the latter filter, the filter discs are pressed together in order to perform their filtering function of removing foreign particles from the water introduced into housing 2 via inlet 6, the outer surfaces of the discs constituting the upstream side of the filter body, and the inner surfaces of the discs constituting the downstream side of the filter body. The foreign particles are either retained on the outer face of the filter discs, or are caught between the finely-ribbed faces of adjacent discs. Such a filter body is of sturdy construction and can retain a relatively large quantity of filtered particles before cleaning is required.

In the above-mentioned known filter construction, the filter is periodically cleaned by opening its housing, releasing the filter discs so that they can freely rotate with respect to each other, and then applying a jet of water to the discs and to the interior of the housing to thoroughly rinse them. Such a cleaning operation, of course, requires that the water supply be turned off and that the filter be manually opened and then rinsed. In the present invention, however, such a cleaning operation is performed automatically without interrupting the supply of water to the filter, and without opening the filter housing to gain access to the filter discs and to the interior of the housing.

Briefly, in the filter apparatus illustrated in the accompanying drawings, the filter discs 12 are pressed together during the normal filtering mode of operation, but are spread apart during a self-cleaning mode of operation. This is done automatically by differential-pressure control means sensing the difference in pressure between the upstream and downstream sides of the filter body 4, and effective, in response to sensing a differential pressure exceeding a predetermined value indicating an undue accumulation of dirt, to initiate the self-cleaning mode of operation. When a self-cleaning mode of operation has been initiated, a first valve is closed between the downstream side of the filter body 4 and the clean water outlet 8, a second valve is opened between the upstream side of the filter body and the dirty water outlet 10, and a drive, generally designated 13, is actuated to permit the filter discs 12 to move apart, whereby a flushing of the filter discs is effected by the water passing through the housing inlet 6 to the dirty water outlet 10.

More particularly, the filter discs 12 of the filter body 4 are received over an inner cylindrical tube 14 integral with the housing 2, tube 14 being formed with an annular series of openings 16 for the water passing through the filter 4. A second inner cylindrical tube 18, extending below and coaxial with tube 14, is also integral with housing 2, tube 18 being similarly formed with an annular series of openings 19 for the filtered water flowing through openings 16 of tube 14 to the clean water outlet 8 of the housing.

A collar 20 is urged against the upper end of the stack of filter discs 12 by means of a spring 22 having one end engaging a pin 23 fixed transversely across the housing 2 between a pair of bars 24 depending from the inner tube 18, the opposite end of the spring engaging the lower end of a rod 26 extending through the housing and movable axially therein under the influence of spring 22. Rod 26 is formed with outer and inner annular projections or abutments 28, 30, the former adapted to engage the outer face of collar 20 causing it to press the stack of filter discs 12 firmly against an annular wall 32 underlying the filter discs and integrally formed with housing 2, while the inner abutment 30 is adapted, after a predetermined displacement of the control rod 26, to move the collar 20 upwardly and thereby to release the filter discs 12.

Rod 26 is hereinafter called a control rod since it controls the filter apparatus to operate either according to the normal filtering mode or according to a self-cleaning mode. During the filtering mode, collar 20 is spring-urged against the filter discs 12 to press them tightly together as mentioned above. During the self-cleaning mode, the rod 26 rises, in the manner to be described below, until its lower abutment 30 raises collar 20 to release the filter discs 12 and to permit them to spread apart under the influence of the water applied through housing inlet 6, so that the latter water thoroughly flushes out the dirt from these filter discs through the dirty water outlet 10.

Disposed within tube 14 is a further tube 34, which tube is also formed with an annular series of openings 35. During the normal filtering mode of operation, openings 35 in tube 34 are in alignment with openings 16 in tube 14 to permit the filtered water to pass, via openings 19 in the lower tube 18, to the clean water outlet 8. Tube 34 is urged to this position by a pair of springs 36 secured at one end to pins 38 fixed within the housing 2, and at the opposite end to end wall 40 of tube 34, the latter end wall being fixed to collar 20 so as to move therewith.

The lower end of the control rod 26 further carries a disc 44 which, during the normal filtering mode of operation, is disposed below opening 19 in the lower tube 18. However, as soon as the control rod 26 is moved upwardly, against the bias of spring 22, to initiate a self-cleaning mode of operation, its lower disc 44 first closes the openings 20 in tube 18 to block any flow to the clean water outlet 8, and then its abutment 30 engages the inner face of the top wall 40 of tube 34 to lift it, and thereby to bring its opening 35 out of alignment with openings 16 of tube 14, so as to block the water flow through the latter openings. As mentioned earlier, this lifting of the control rod 26 also lifts collar 20 from engagement with the filter discs 12, permitting the discs to spread apart and thereby to be thoroughly rinsed by the water flowing through the housing inlet 6 to the dirty water outlet 10, which meanwhile has opened, as will be described more particularly below.

Control rod 26 is driven by hydraulic motor 13 supplied by the pressurized liquid introduced into housing inlet 6. Hydraulic motor 13 includes a plunger or piston 50 fixed to the control rod 26 and movable within a cylinder 52 in response to the pressurized liquid introduced into inlet 54 of an expansible chamber 56 defined by piston 50 and cylinder 52. Chamber 57 on the other side of piston 50 is vented to the atmosphere, or to expansible chamber 56. The movement of control rod 26 during the expansion of chamber 56 is opposed by spring 22, which spring returns piston 50 and control rod 26 to their initial positions, illustrated in FIG. 1, under the control of a valve 58 connected to outlet 60 of the expansible chamber 56.

A self-cleaning mode of operation is initiated whenever the difference in pressure between the upstream and downstream sides of the filter body 4 reaches a predetermined maximum, thereby indicating an undue accumulation of foreign particles on the upstream face of the filter body 4 and/or between the ribbed faces of the filter discs 12 making up the filter body. This differential pressure is sensed by a first sensor $S_1$ and a second sensor $S_2$.

Sensor $S_1$ has a first inlet 70 connected to the dirty water outlet 10 at which appears the pressure at the upstream side of the filter body 4, and a second inlet 72 connected to a fitting 74 at which appears the pressure at the downstream side of the filter body. When the predetermined differential pressure is sensed by sensor $S_1$, it actuates a valve 76 to permit the discharge through an outlet 78 of the dirty water appearing at the dirty water outlet 10 of the housing.

The second sensor $S_2$ has a first inlet 80 connected to a fitting 82 at which appears the upstream pressure, and a second inlet 84 connected to the previously-mentioned fitting 74 at which appears the downstream pressure. Sensor $S_2$ also includes a valve 86 which, when sensing the predetermined pressure difference, is opened to supply pressurized water to a further valve 88 which controls the hydraulic motor 13 to initiate a self-cleaning mode of operation.

Differential-pressure sensor $S_1$ is preset to operate preferably at an instant before sensor $S_2$, so that the dirty-water outlet valve 76 will be opened an instant before the actual cleaning mode of operation is started by sensor $S_2$.

Valve 88 which supplies the pressurized water to the hydraulic motor 13 includes an operator 90 adapted to be actuated, at different times, by two limit actuators 92, 94 carried by the control rod 26. Thus, the upper actuator 94 engages operator 90 at the end of a self-cleaning mode of operation to open valve 88, and the lower actuator 92 engages operator 90 during a self-cleaning mode of operation to close valve 88 and thereby to limit the extent of displacement of control rod 26 during its forward stroke, permitting the control rod to return during its return stroke under the influence of spring 22.

The filter illustrated in the drawings operates as follows: During the normal filtering mode of operation of the filter, the parts are in their positions as illustrated in FIG. 1, wherein chamber 56 of the hydraulic motor 13 is in its contracted condition, and control rod 26 is in its lowermost position. In this condition, spring 22 urges collar 20 against the filter elements 12 of the filter body 4, thereby compacting the filter elements and enabling them to perform their normal filtering function. Also openings 35 in tube 34 are aligned with openings 16 in tube 14; and disc 44 at the lower end of the control rod 26 is below openings 19 in tube 18. The water inletted through the housing inlet 6 thus passes through the compacted filter elements 12, aligned openings 16 and 35 in tubes 14 and 34, through openings 19 in tube 18 and through the housing outlet 8.

During this filtering mode of operation it will be appreciated that: disc 44 at the end of the control rod 26 and openings 19 of tube 18, serve as a first control valve, which is open to permit the filtered water to flow out of housing outlet 8 (tube 34 with its openings 35, movable with respect to openings 16 of tube 14, also serves as a first control valve since it performs the same function); valve 76 serves as a second control valve, which is closed thereby blocking the flow of water through the dirty water outlets 10 and 78; valve 86 serves as a third valve, which is also closed thereby blocking the flow of pressurized water to the hydraulic motor 13; and valve 88 serves as a fourth control valve, which is open, having been opened by actuator 94, so that when valve 86 later opens under the control of the differential pressure sensor $S_2$, the pressurized water will be immediately transferred via valve 88 and inlet 54 into the expansible chamber 56 of the hydraulic motor. In addition, valve 58 serves as a fifth control valve, which has been initially preset so as to fix the time interval of the self-cleaning mode of operation, when that operation is initiated as described below.

During the filtering mode, the filtering apparatus thus filters the water introduced via inlet 6 before passing through outlet 8, and as a result, the differential pressure on the opposite side of the filter body 4 increases with the accumulation of foreign particles on or within the filter body. When the differential pressure reaches a predetermined magnitude, sensor $S_1$ is first actuated to open valve 76, to thereby open the dirty water outlets 10 and 78. At about the same time, or preferably an instant later, sensor $S_2$ is actuated to feed pressurized water via valves 86 and 88 into the expansible chamber 56 of the hydraulic motor 13, whereupon the piston 50 of the hydraulic motor begins to rise within cylinder 52.

Figure 2:
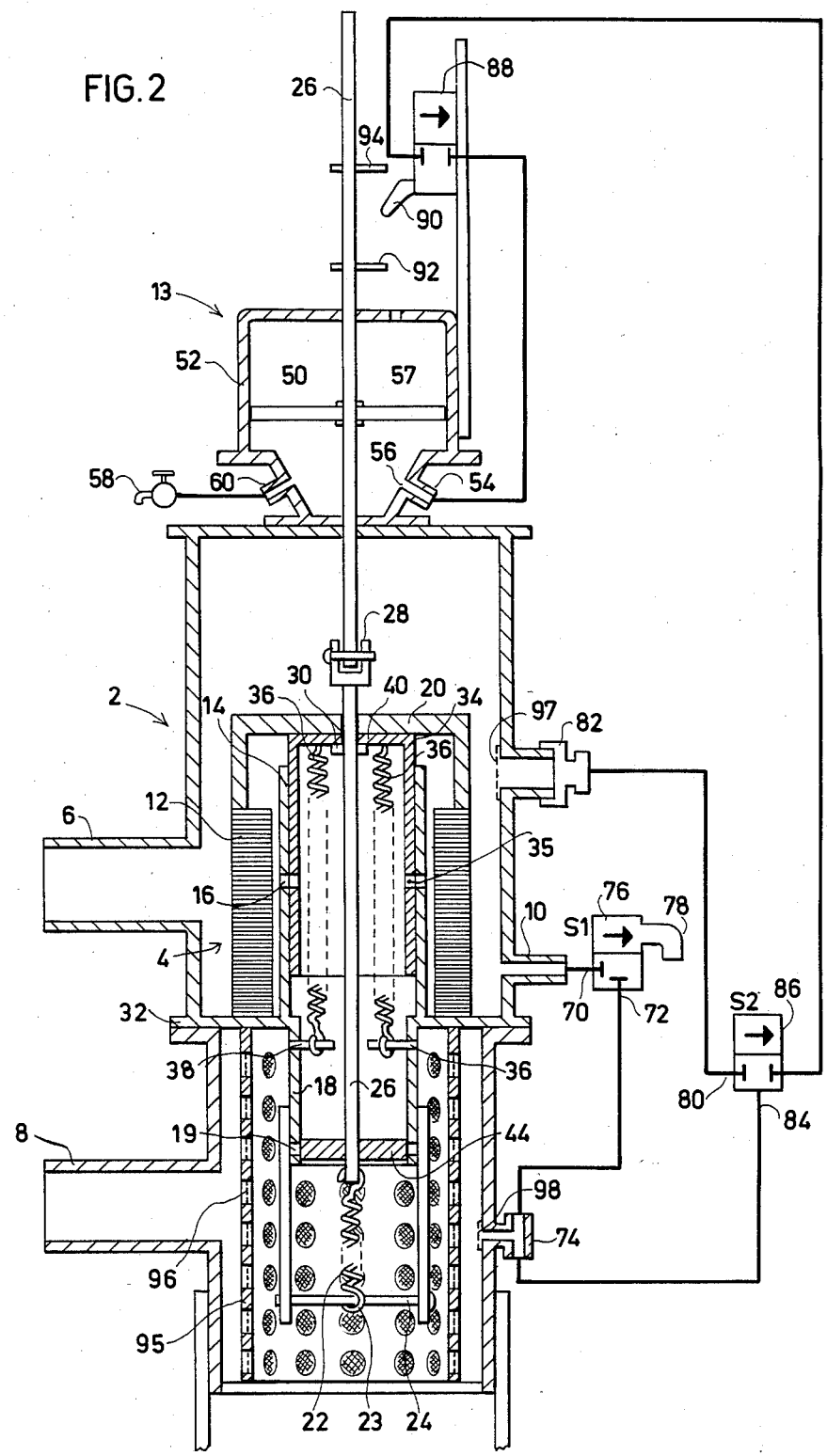
FIG. 2 illustrates the apparatus of FIG. 1 at the start of a cleaning mode of operation.

During the first movement of the control rod 26, its valve disc 44 covers openings 19 in tube 18, thereby blocking the flow of filtered water through the clean water outlet 8. As control rod 26 continues to rise, its abutment 30 engages the underface of end wall 40 of tube 34. This is the condition illustrated in FIG. 2.

Chamber 56 of the hydraulic motor 13 meanwhile continues to expand, thereby lifting control rod 26 further, so that its abutment 30 starts to raise tube 34, and also collar 20 out of contact with the filter elements 12 of the filter body 4. Raising tube 34 brings its openings 35 out of alignment with openings 16 in tube 14, thereby blocking the flow of water into the interior of tubes 34 and 18. Raising collar 20 releases the pressure on the filter elements and permits them to spread apart as they are thoroughly rinsed by the water introduced through the housing inlet 6, which water is flushed out through the dirty water outlets 10 and 78 via the open valve 76.

Figure 3:
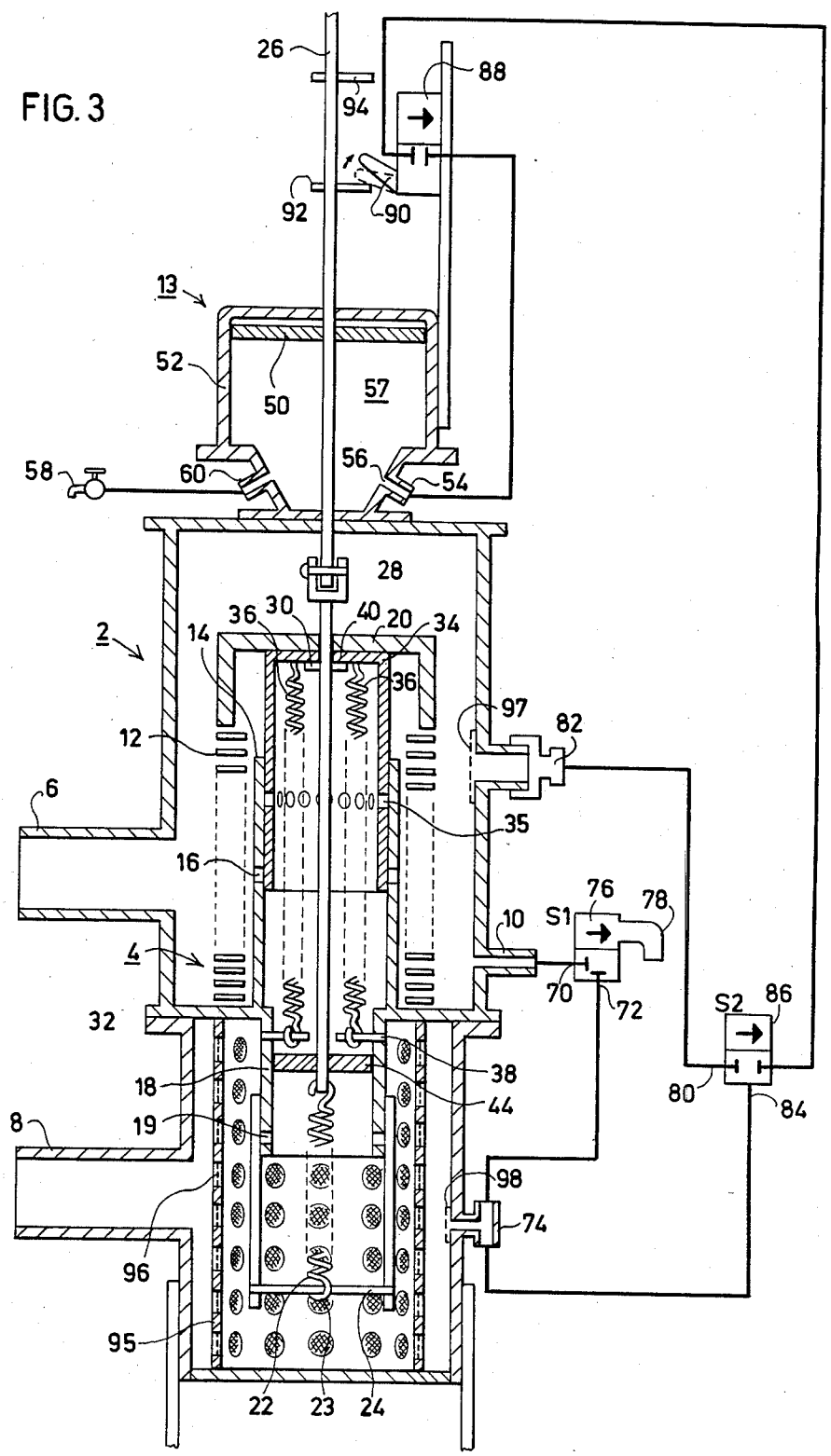
FIG. 3 illustrates the apparatus of FIG. 1 at the midpoint of a self-cleaning mode of operation.

Control rod 26 continues to rise until its lower actuator element 92 reaches operator 90 of valve 88, closing the latter valve, and thereby terminating the flow of water into the expansible chamber 56. This is the limit of the forward stroke of the hydraulic motor 13, and is the condition illustrated in FIG. 3.

The hydraulic motor 13 now starts its return stroke during which piston 50 begins to descend under the influence of spring 22, the rate of descent being controlled by the presetting of valve 58. Towards the end of the return stroke, collar 20 is first pressed against the filter elements 12 of the filter body, permitting the filter body to perform its normal filtering function; openings 35 in tube 34 are brought into alignment with openings 16 in tube 14, to permit the flow of the filtered water to the interior of the tubes; and finally valve disc 44 is moved below openings 19 in tube 18, to permit the flow of the filtered water to the clean water outlet 8. When the control rod 26 reaches its normal, lowermost position, which is the condition illustrated in FIG. 1, limit actuator 94 on rod 26 engages operator 90 of valve 88, thereby opening the valve in preparation for another cleaning mode of operation whenever that operation is initiated by sensors $S_1$ and $S_2$.

It will be appreciated that differential pressure sensor $S_2$ merely initiates a self-cleaning mode of operation, and once initiated, the further control is transferred to valve 88 which continues the self-cleaning operation, terminating the forward stroke of the hydraulic motor 13 at a predetermined point in the movement of control rod 26. It will also be appreciated that valve 58 presets the rate of return of the control rod during its return stroke and thereby fixes the time duration of the self-cleaning operation, which time duration may also be affected by the selected positions of actuators 92 and 94.

To make sure that no dirty water passes through the clean water outlet 8, which could result in considerable damage to the irrigation devices (e.g. drippers or sprinklers) supplied with the clean water, the filter includes a back-up filter tube 95 formed with a plurality of openings 96 each covered with a filter screen, the back-up filter being between tube 18 and the clean water outlet 8. In addition, fittings 82 and 74, since they are on the upstream side of the filter body 4, would preferably also be provided with a filter screen, as shown at 97 and 98, respectively, to remove any foreign particles flowing to sensor $S_2$ or to the hydraulic motor 13 controlled by that sensor. Preferably, the valve operator 90 is a bistable one (e.g. controlled by an over-center spring) so as to be stable in either of its two operating conditions.

It will be appreciated that sensors $S_1$ and $S_2$ could be combined as a single sensor performing the various operations described. Also, the control valves illustrated could take many other forms; for example, the control valve constituted by valve disc 44 actuated by control rod 26 and cooperable with openings 19 could be, particularly in larger-size installations, in the form of a piston movable in and out of a valve passageway to control the flow through the clean water outlet. In addition, in larger-size installations, there could be two or more of such filter devices connected in parallel to the water supply line, so that if one filter becomes clogged and goes into its self-cleaning mode of operation, the other filter can still perform the filtering function, thereby permitting the water flow to continue. Further, it will be appreciated that the filter device could be used for other fluids, e.g., other liquids or even gases.

Many other variations, modifications and applications of the invention may be made.

What is claimed is:

1. Filter apparatus adapted to be connected to a supply line for a fluid to be filtered and to be operated according to either a filter mode or a self-cleaning mode, comprising:
   a housing having a filter body therein;
   said housing including an inlet on the upstream side of the filter body, a clean fluid outlet on the downstream side of the filter body, and a dirty fluid outlet on the upstream side of the filter body;
   said filter body including a plurality of filter elements which are adapted to be pressed together during the filtering mode of operation, and spread apart during the self-cleaning mode of operation;
   a drive for moving the filter elements apart;
   a first valve between the downstream side of the filter body and the clean fluid outlet;
   a second valve between the upstream side of the filter body and the dirty fluid outlet;
   and differential pressure control means sensing the difference in pressure between the upstream and downstream sides of the filter body, and effective, in response to sensing a differential pressure exceeding a predetermined value, to initiate a self-cleaning mode of operation by closing said first valve, opening said second valve, and actuating said drive to permit the filter elements of the filter body to move apart and to be cleaned by the fluid.

2. Filter apparatus according to claim 1, wherein said filter elements are in the form of annular filter discs whose surfaces constitute the upstream side of the filter body and whose inner surfaces constitute the downstream side of the filter body.

3. The filter apparatus according to claim 1, wherein said drive means comprises:

a motor which is actuated when said differential pressure control means senses the predetermined pressure difference to initiate a self-cleaning mode of operation;
a control rod displaced by said motor;
and a pressure member normally biased to press together said filter elements, but moved by said rod when displaced by said motor to cause the filter elements to spread apart during the self-cleaning mode of operation.

4. The filter apparatus according to claim 3, wherein said control rod actuates said first valve to close the clean fluid outlet as soon as the control rod is displaced by the motor at the start of a cleaning mode of operation.

5. The filter apparatus according to claim 4, wherein said first valve comprises a tube formed with an opening establishing flow communication between the downstream side of the filter body and the clean fluid outlet, and a valve member movable by said control rod such that said member closes said opening at the beginning of the displacement of the control rod by said motor.

6. Filter apparatus according to claim 3, wherein said differential pressure control means actuates a third valve to cause pressurized fluid to flow from the filter housing to the motor to drive same upon sensing a predetermined difference in pressure.

7. Filter apparatus according to claim 6, wherein said motor comprises an expansible chamber including a cylinder and piston, one of which is movable with respect to the other and is coupled to said control rod upon the expansion of said chamber by the pressurized fluid.

8. Filter apparatus according to claim 7, wherein said drive includes a fourth control valve which is actuated by said control rod upon its displacement at the start of a cleaning mode of operation, said fourth control valve being effective to cause the expansible chamber to continue to expand and to continue to displace the control rod until reaching a predetermined limit, at which time the control rod again actuates said fourth control valve to terminate the flow of pressurized fluid from the filter housing into the chamber.

9. The filter according to claim 8, wherein said control rod includes a first actuator element which is effective to open said fourth control valve during a filter mode of operation, and a second actuator element which is effective to close said fourth control valve when the control rod is displaced a predetermined distance during the self-cleaning mode of operation.

10. Filter apparatus according to claim 7, wherein said control rod is biased by springs to contract said chamber by forcing the fluid therein to leave same via a fifth control valve, which latter control valve may be preset to control the rate of contraction of said chamber.

* * * * *